3,034,893
METHOD OF DISSOLVING FINELY DIVIDED METALS

Rolf S. Bruenner, West Long Branch, N.J., assignor to the United States of America as represented by the Secretary of the Army
No Drawing. Filed Mar. 27, 1959, Ser. No. 802,578
8 Claims. (Cl. 96—60)
(Granted under Title 35, U.S. Code (1952), sec. 266)

The invention described herein may be manufactured and used by or for the Government for governmental purposes without the payment of any royalty thereon.

This invention relates to a method of dissolving metals and more particularly finely dispersed metals by treating the finely dispersed metals with the salt of an organic compound that acts as an oxidizing agent upon the dispersed metal particles and thereby decomposes into a metal complexing agent. The invention is particularly useful for the production of photographic bleach baths.

Conventional bleach baths consist of either a strong oxidizing agent alone (such as sodium or potassium dichromate) or a combination of a weaker oxidizing agent such as potassium ferricyanide with a photographic complexing agent such as sodium thiosulfate (e.g., Farmer's reducer).

Using a combination of a weak oxidizing agent (Y) and a complexing agent (Z) the following reactions take place. First the oxidizing agent (Y) reacts upon the silver to form silver ions:

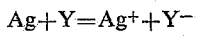
$$Ag + Y = Ag^+ + Y^-$$

Then a silver ion reacts with a number ($n$) of ions or molecules of the complexing agent (Z) to form a water soluble complex ion:

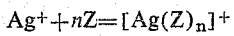
$$Ag^+ + nZ = [Ag(Z)_n]^+$$

thus reducing the silver ion concentration in solution so that the effect of the oxidizing agent becomes stronger.

I now have found that the aqueous solution of a salt of a compound represented by the following structural formula:

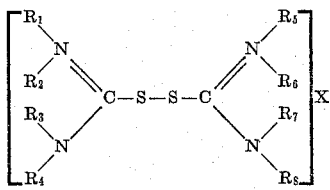

$$\begin{bmatrix} R_1 & & & & R_5 \\ & N & & N & \\ R_2 & & & & R_6 \\ & C-S-S-C & & \\ R_3 & & & & R_7 \\ & N & & N & \\ R_4 & & & & R_8 \end{bmatrix} X$$

may be used at once as oxidizing and complexing agent. In this formula $R_1$ to $R_8$ each represent a member of the group consisting of hydrogen and aliphatic radicals containing from 1 to 6 C atoms and X represents the anion of a strong acid. Such a salt, if brought into contact with a finely dispersed metal, for instance, silver, will oxidize the silver sending silver ions into solution whereby said salt decomposes into a complexing agent which combines with the silver ions, thus reducing the silver ion concentration in the solution which causes further oxidization of the metallic silver, etc. In other words, the product that results from the reaction of the new oxidizer compound $(Z_2)^{++}$ with the silver is a complexing agent (Z), and this complexing agent (Z) will now react with the silver ions, thus reducing their concentration. The new reaction may be expressed as follows:

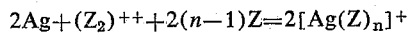
$$2Ag + (Z_2)^{++} + 2(n-1)Z = 2[Ag(Z)_n]^+$$

The reaction product of the new oxidizer-complexing agent need not be replaced now by a separate complexing agent; it is chemically bound to the silver ion. The energy of complex formation and oxidization merges in a coupled reaction. This permits the use of weaker oxidizing agents. A bleach bath made with the help of the new oxidizer-complexing agent may, for instance, be used with extraordinary advantages for bleaching color films that contain dyes susceptible to fading by oxidation with conventional oxidizers.

I have further found that it is advantageous to use the new oxidizer-complexing agent in conjunction with additional metal complexing agents. These additional complexing agents may be either identical or different from the complexing agents formed as the reaction products between the new oxidizer-complexing agent and the finely dispersed metal. The new oxidizer-complexing agent may upon reduction form either identical or different complexing molecules or ions as well as only one complexing molecule or ion and one or more indifferent molecules or ions.

The invention will become more apparent from the following description of specific embodiments.

Example 1

16 g. of the bromide of bis (amino-imino-methyl) disulfide of the formula $[(NH_2)_2CS_2C(NH_2)_2]Br_2$ (dithiourea dibromide) is dissolved in 100 mls. of saturated thiourea solution containing about 50 g. of KBr. The KBr increases the stability of the solution; the thiourea acts as the additional complexing agent.

In making the above-described solution a crystalline precipitate will be formed which, however, is not separated from the solution. This bleach bath remains stable for a few weeks. More dilute solutions show about the same bleaching power but are not quite as stable and decompose gradually whereby sulfur is precipitated.

The above-described bleach bath is capable of completely bleaching a silver image of the density of 1.7 on Halobrome paper grade 3 within 15–30 seconds resulting in a clear white paper.

The bleach bath made according to this example is highly acid (it has a pH of about 3). If used in color photography some dyes may therefore become colorless, but their color can be easily restored by neutralization of the acid.

Example 2

20 g. of di-(tetramethylthiourea)-dibromide of the formula $[(CH_3)_2N]_2CS_2C[N(CH_3)_2]_2Br_2$ and 25 g. KCNS are dissolved in 100 ml. water. A small amount (e.g. 1–2 g.) of $K_2HPO_4$ is added as a buffer to keep the pH at 6. This solution is somewhat more stable than the bleach bath made according to Example 1 but bleaches slower. Instead of thiourea, other additional complexing agents such as sodium thiocyanate or other thiocyanates, or the alkali salts of ethylene-dithylene-dinitrilo-tetra-acetic acid may be used.

Example 3

Instead of the salt mentioned in Example 2, di (trimethylthiourea) dibromide is used having the formula $[(CH_3)_3HN_2CS_2CN_2H(CH_3)_3]Br_2$.

In all examples the bromides of the new oxidizer-complexing agents may be replaced by chlorides, fluorides, nitrates, sulfates, phosphates, etc.

The above-described solutions may be used for purposes other than bleaching color negatives, as for examples, for combined bleaching and fixing baths, for correction of negatives and prints (line copy in particular), for removing noble metals (silver, gold, platinum) from mirrored surfaces, for printing, etc.

Methods for making the above-described disulfide compounds are described in the following literature:

Claus, Liebigs Annalen der Chemie, vol. 179, pp. 136 to 139.

Fromm, Liebigs Annalen der Chemie, vol. 447, p. 290.

Fromm & Heyder, Berichte der deutschen Chemischen Ges, vol. 42, p. 3804.
Marshall, Zentralblatt, vol. 1902 II, p. 1100.
McGowan, J. of the Chem. Soc. of London, vol. 49, pp. 191–195 and vol. 51, pp. 378–381, 666, 671.
J. f. Prakt Chemie, vol. 2–33, pp. 188–192 and vol. 2–36, pp. 216–218, 221.
Naik, J. of Chem. Soc. of London, vol. 119, p. 1168.
Remsen and Turner, Am. Chem. J., vol. 25, p. 192.
Storch, Monatshefte f. Chemie, vol. 11, pp. 458, 465.
Lecher, Liebigs Annalen der Chemie, vol. 445, p. 51.
Gihosh and Gruha, J. Indian Chem. Soc., vol. 6, p. 193.
Beilstein, Organische Chemie, vol. III, p. 194; vol. E II 4, pp. 576–77; vol. E II 23, p. 322.

It will be understood by those skilled in the art that many changes in the above compositions, products and processes, may be made without departing from the inventive idea defined in the appended claims.

What is claimed is:

1. Method of dissolving metals comprising treating the metal in a finely dispersed state with an aqueous solution of a salt of a compound represented by the following structural formula:

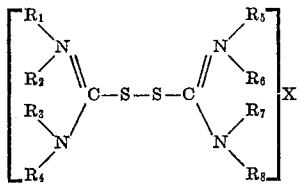

in which $R_1$ to $R_8$ each represent a member of the group consisting of hydrogen and aliphatic radicals containing from 1 to 6 C atoms and in which X represents the anion of a strong acid, said salt acting as an oxidizing agent upon the finely dispersed metal thereby sending metal ions into the aqueous solution and decomposing into a metal complexing agent capable of complexing the ions of said oxidized metal, said aqueous solution also containing an additional metal complexing agent capable of complexing the ions of said oxidized metal.

2. Method of dissolving metals according to claim 1 in which the metal is selected from the group consisting of chromium, manganese, iron, cobalt, nickel, palladium, osmium, platinum, copper, silver, gold, zinc, cadmium, mercury, tin and lead.

3. Method of dissolving metals according to claim 1 in which said salt consists of a salt of bis (amino-imino-methyl) disulfide.

4. Method of dissolving metals according to claim 3 in which said salt consists of the bromide of bis (amino-imino-methyl) disulfide.

5. Method of dissolving metals according to claim 1 in which said salt consists of a salt of bis (dimethylamino-dimethyl imino-methyl) disulfide.

6. Method of dissolving metals according to claim 5 in which said salt consists of the bromide of bis (dimethyl-amino-dimethylimino-methyl) disulfide.

7. Method of dissolving metals according to claim 1 in which said salt consists of a salt of bis (dimethylamino-monomethylimino-methyl) disulfide.

8. Method of dissolving metals according to claim 7 in which said salt consists of the bromide of bis (dimethyl-amino-monomethylimino-methyl) disulfide.

References Cited in the file of this patent
UNITED STATES PATENTS
2,100,594    Heymer _____ Nov. 30, 1937

OTHER REFERENCES

Clerc: Photographic Theory and Practice, Pitman and Sons, New York (1937), page 268.

McGowan: J. Chem. Soc. London, vol. 49, pp. 191–195.